United States Patent
Ishihara et al.

(10) Patent No.: US 7,798,574 B2
(45) Date of Patent: Sep. 21, 2010

(54) RECLINING APPARATUS

(75) Inventors: Yoshitaka Ishihara, Ichinomiya (JP); Kazuyoshi Hara, Kani (JP)

(73) Assignee: Kabushiki Kaisha Imasen Denki Seisakusho, Invyama (JP)

( * ) Notice: Subject to any disclaimer, the term of this patent is extended or adjusted under 35 U.S.C. 154(b) by 135 days.

(21) Appl. No.: 12/185,789

(22) Filed: Aug. 4, 2008

(65) Prior Publication Data
US 2009/0038433 A1    Feb. 12, 2009

(30) Foreign Application Priority Data
Aug. 7, 2008    (JP) .............................. 2007-204923

(51) Int. Cl.
*B60N 2/02*    (2006.01)
(52) U.S. Cl. ..................... 297/362; 297/366
(58) Field of Classification Search ................ 297/362, 297/367
See application file for complete search history.

(56) References Cited

U.S. PATENT DOCUMENTS 4,275,924 A * 6/1981 Lehmann et al. ............ 297/362
4,469,376 A * 9/1984 Pelz ............................ 297/362
4,563,039 A * 1/1986 Jorg ............................ 297/362
5,749,626 A * 5/1998 Yoshida ................... 297/367 R

FOREIGN PATENT DOCUMENTS

JP    2005-312891 A    11/2005

* cited by examiner

*Primary Examiner*—Sarah B McPartlin
(74) *Attorney, Agent, or Firm*—Hiroe & Associates; Taras P Bemko

(57) ABSTRACT

A vehicle seat reclining apparatus is provided in which the strength of a connecting portion positioned directly or nearly directly below a receiving wall face of a guide portion of a fixed-side housing is higher than in a conventional reclining apparatus. A protruding guide portion is provided in a fixed-side housing used to configure a reclining apparatus. A receiving wall face that makes contact with a locking gear used to configure the reclining apparatus and which thus guides movement of the locking gear, and a top face that is continuous with that receiving wall face, are formed in the guide portion. A tapered chamfer portion is present at an edge of the receiving wall face where the receiving wall face and the top face of the guide portion intersect. A thick portion with a tapered face that corresponds to the chamfer portion is provided directly or nearly directly below a base end portion of the receiving wall face. A connecting portion that connects the guide portion with other parts of the fixed-side housing is thickened at this thick portion.

7 Claims, 5 Drawing Sheets

RECLINING APPARATUS

BACKGROUND OF THE INVENTION

1. Field of the Invention

The present invention relates mainly to a reclining apparatus of a vehicle seat. More specifically, the present invention relates to structural reinforcement of a housing member that is a constituent element of a reclining apparatus.

2. Description of the Related Art

Reclining apparatuses are known in which a seat back is supported so as to be inclinable relative to a seat, and in which the seat back can be switched between a locked state and an unlocked state. Such a reclining apparatus is disclosed in JP 2005-312891A, for example. Below, a simple description of the technical content of JP 2005-312891A is given, citing the reference numerals used in JP 2005-312891A.

The reclining apparatus according to JP 2005-312891A is provided with a fixed-side housing 11 and a rotating-side housing 12 whose outer shell forms a disk-like shape, and the reclining apparatus is configured by fitting the housings 11 and 12 together facing each other. The fixed-side housing 11 is installed to a seat cushion-side of a vehicle seat, and the rotating-side housing 12 is installed to a seat back-side of the vehicle seat. A storage space is secured between the fixed-side housing 11 and the rotating-side housing 12, which are disposed facing each other, and in this storage space, a plurality of slide poles 15 (also referred to as "locking gears"), a rotating cam 16, and other members are stored.

A ring-shaped ratchet 12c (corresponding to an "internal gear") that has inner teeth on its inner circumferential side is provided in the rotating-side housing 12. On the other hand, outer teeth that can engage with the inner teeth of the ring-shaped ratchet 12c are provided at the end of each slide pole 15. The rotating cam 16 is disposed in a center region of the group of slide poles 15 in order to push each of the plurality of slide poles 15 toward the inner teeth of the ratchet 12c. By engaging or separating the outer teeth of each slide pole 15 with/from the inner teeth of the ratchet 12c according to operation of the rotating cam 16, a locked or unlocked state of the seat back is realized.

As shown in FIG. 7 (reproduced as FIG. 7A in the present application) of JP 2005-312891A, several guide portions 30 are formed integrated with the fixed-side housing 11. These guide portions 30 are for holding a slide pole 15 that is disposed between two adjacent guide portions 30, such that the slide pole 15 can move in the radial direction of the fixed-side housing 11, and in each guide portion 30, receiving wall faces 31 that make contact with the slide pole 15 are formed. The receiving wall faces 31 function both as guide faces that guide advancement/withdrawal of the slide pole 15 relative to the ratchet 12c, and as regulating faces that regulate movement in the circumferential direction of the slide pole 15. Moreover, in each guide portion 30, two stress concentrating portions 33 provided in one receiving wall face 31 of the guide portion 30, and a flat portion 34 positioned between the two stress concentrating portions 33 in roughly the center of that receiving wall face 31, are provided.

The fixed-side housing 11 of JP 2005-312891A is obtained by press-molding a metal plate as material, and each guide portion 30 is formed in an integrated manner by press-molding from one face side of the fixed-side housing 11 toward the rotating-side housing 12. Consequently, as shown in FIG. 7B reflecting the right angle edge shape of the press-molding die, the cross-sectional structure is such that the guide portion 30 and a main body side portion 41 that is continuous with the guide portion 30 are offset with a height difference in the thickness direction (the vertical direction in FIG. 7B) of the fixed-side housing 11. As a result, the thickness of a connecting portion 42 positioned directly below the receiving wall face 31 (that is, a connecting portion 42 that connects the guide portion 30 and the main body side portion 41 that is continuous with the guide portion 30) is very small. Therefore, when a large load reaches to the receiving wall face 31 via the slide pole 15 during a vehicle collision, there is a risk that the thin connecting portion 42 directly below the receiving wall face 31 will break.

Also, the object of the technology in JP 2005-312891A is to, by adopting a structure in the receiving wall face 31 of the guide portion 30 that includes the two stress concentrating portions 33 and the flat portion 34 that is recessed relative to the stress concentrating portions, reduce the force necessary for operation of the slide pole 15, thus insuring durability against the load when the seat back has been inclined. However, there is the drawback that when a surface pressure with which the slide pole 15 presses against the receiving wall face 31 (in particular the stress concentrating portions 33) of the guide portion 30 is extremely high, for example such as during a vehicle collision, there is a high risk that the thin connecting portion 42 will break.

SUMMARY OF THE INVENTION

It is an object of the invention to provide a reclining apparatus in which the strength of a connecting portion positioned directly or nearly directly below a receiving wall face of a guide portion in a fixed-side housing is higher than in a conventional reclining apparatus.

The invention is a reclining apparatus provided with a fixed-side housing and a rotating-side housing that are disposed facing each other, an internal gear provided in the rotating-side housing, and a locking gear that is provided in a storage space secured between the fixed-side housing and the rotating-side housing and is capable of being engaged with or separated from the internal gear. A plurality of guide portions are provided in the fixed-side housing and protrude toward the rotating-side housing, and a receiving wall face that makes contact with the locking gear and thus guides movement of the locking gear, and a top face that is continuous with that receiving wall face, are formed in each guide portion. A tapered chamfer portion is provided at an edge of the receiving wall face in a position where the receiving wall face and the top face of the guide portion intersect. By providing a thick portion that has a tapered face that corresponds to the tapered chamfer portion, the thick portion being provided directly or nearly directly below a base end portion of the receiving wall face, a connecting portion that connects the guide portion of the fixed-side housing with other parts is thickened.

In the reclining apparatus of the invention, preferably, the thick portion that thickens the connecting portion is disposed opposite to the tapered chamfer portion, and a tapered face of the thick portion is approximately parallel to the tapered chamfer portion. Preferably, the tapered chamfer portion is provided in one part of the entire span of the edge of the receiving wall face in the position where the receiving wall face and the top face intersect. Furthermore, it is preferable that the fixed-side housing is produced by press-molding a metal plate, and the receiving wall face, the top face, and the tapered chamfer portion of the guide portion, as well as the connecting portion thickened with the thick portion, are molded as a single body when the metal plate press-molding is performed.

According to the invention, in the fixed-side housing, by providing the thick portion having the tapered face corresponding to the tapered chamfer portion, the thick portion being provided directly or nearly directly below the base end portion of the receiving wall face of the guide portion, the connecting portion that connects the guide portion with other parts in the fixed-side housing is thickened, so it is possible to increase the strength of the connecting portion relative to a conventional reclining apparatus. Consequently, even in a case where the locking gear has pressed against the receiving wall face of the guide portion with a high surface pressure, for example such as during a vehicle collision, it is possible to reduce the risk that the connecting portion will break relative to a conventional reclining apparatus.

According to the invention, not only is thickening of the connecting portion achieved by providing the thick portion having the tapered face, the thick portion being provided directly or nearly directly below the base end portion of the receiving wall face of the guide portion, but furthermore, at the edge of the receiving wall face, the tapered chamfer portion is provided corresponding to the tapered face of the thick portion. Therefore, even when manufacturing the fixed-side housing by press-molding a metal plate, it is possible to avoid a situation in which the edge of the molding die bites into the metal plate (the fixed-side housing) so that pressing deformations concentrate in the connecting portion, and so it is possible to prevent as much as possible the occurrence of breakage or molding defects when pressing caused by pressing deformations. Consequently, it is possible for the fixed-side housing to have excellent durability.

In this embodiment, as a result of providing the tapered chamfer portion at the edge of the receiving wall face of the guide portion, to that extent the area of the receiving wall face can be reduced, so it is possible to reduce the force necessary to operate the locking gear.

DESCRIPTION OF THE PREFERRED EMBODIMENTS

Figure 4:
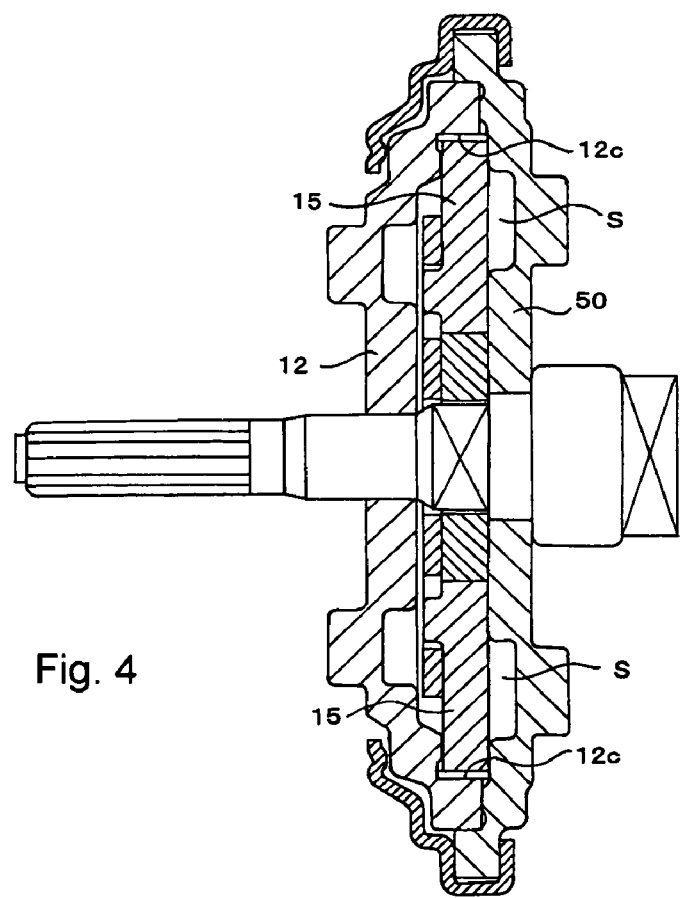
FIG. 4 is an outline cross-sectional view of the entire reclining apparatus.

Below, an embodiment of the present invention will be described with reference to the accompanying drawings. The reclining apparatus of this embodiment is provided with the same basic configuration as the reclining apparatus in the above Description of the Related Art. That is, as shown in FIG. 4, the reclining apparatus of this embodiment is provided with a fixed-side housing 50 and a rotating-side housing 12 that are disposed facing each other. Internal gears 12c are provided in the rotating-side housing 12, and locking gears 15 that can be engaged with or separated from the internal gears 12c are provided in a movable manner in storage spaces S secured between the fixed-side housing 50 and the rotating-side housing 12. The main structural feature of this embodiment is the fixed-side housing 50, so the fixed-side housing 50 is the focus of the following description.

Figure 1:
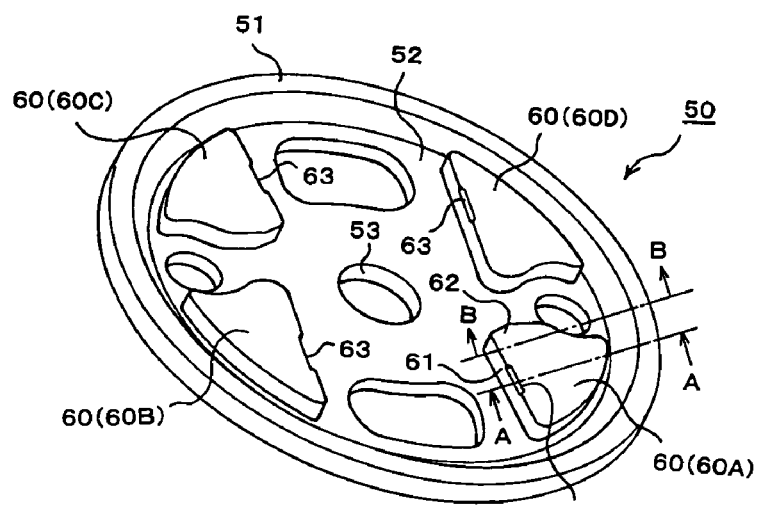
FIG. 1 is a perspective view that shows a fixed-side housing of a reclining apparatus according to one embodiment.
Figure 2A:
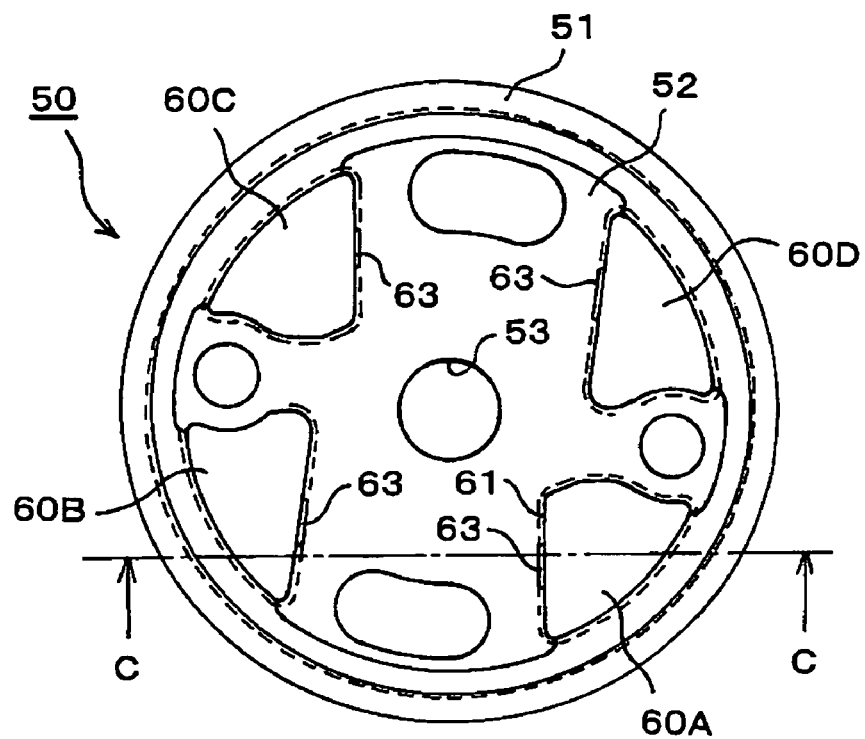
FIG. 2A is a plan view of the fixed-side housing shown in FIG. 1.

FIGS. 1 to 3 show a base plate 50 as the fixed-side housing used in a reclining apparatus of a vehicle seat. As shown in FIGS. 1 and 2, the base plate 50 is formed as a disk-like member whose outer edge is round. The base plate 50 has a ring-shaped outer circumferential portion 51, and thereby a recess 52 is secured inside of the base plate 50. A through hole 53 is formed in the center of the base plate 50.

At positions surrounding the center through hole 53 within the recess 52 of the base plate 50, a total of four protruding guide portions 60 (60A, 60B, 60C, and 60D) are provided. In this embodiment, the guide portions 60A and 60B form a pair, and the guide portions 60C and 60D form a pair. That is, two groups (two pairs) of guide portions are present. The area between the two guide portions 60 in each guide portion pair is secured as an area for holding a locking gear 15 so as to be movable in the radial direction of the base plate 50. That is, the base plate 50 of this embodiment is capable of holding two locking gears 15.

Figure 2B:
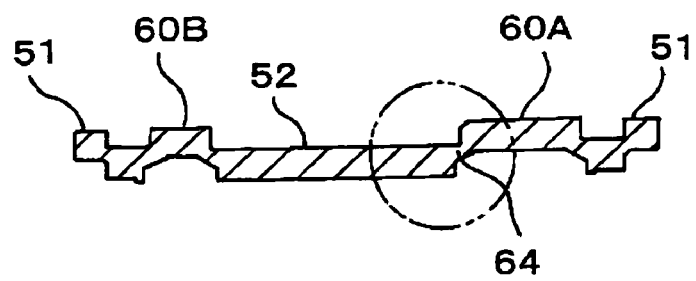
FIG. 2B is a cross-sectional view taken along line C-C in FIG. 2A.
Figure 3A:
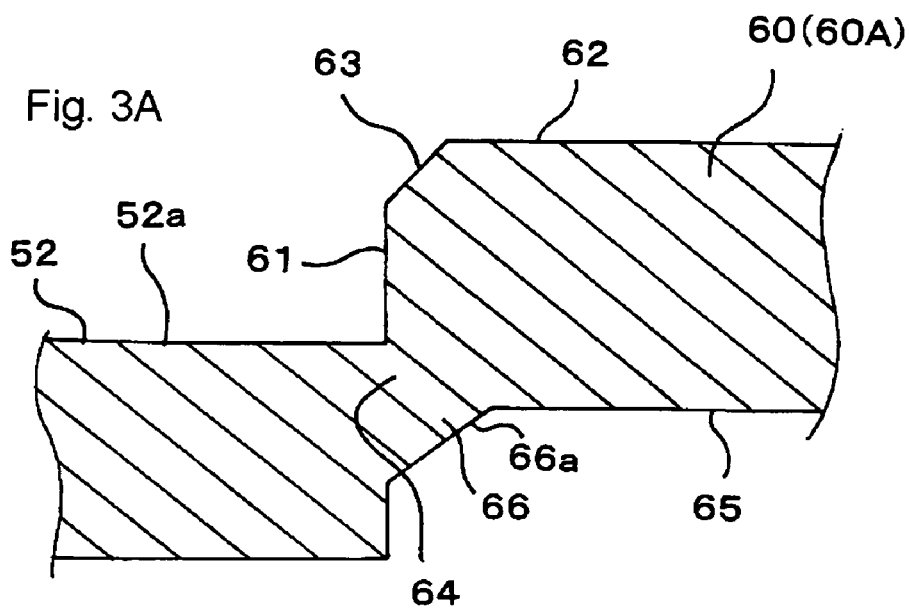
FIG. 3A is an enlarged outline cross-sectional view of a cross-section taken along line A-A in FIG. 1.

Next is a description of the structural features of each guide portion 60. FIG. 2B is an outline cross-section taken along line C-C set so as to span the pair of guide portions 60A and 60B shown in FIG. 2A. FIG. 3A is a partially enlarged cross-section taken along line A-A in FIG. 1, and is an enlarged view of the portion in FIG. 2B that is enclosed by the double-dotted circle.

As shown in FIGS. 2 and 3, each guide portion 60 has a receiving wall face 61 that makes contact with a locking gear 15 and thus guides the locking gear 15. The receiving wall face 61 of each guide portion 60 is positioned such that the receiving wall face 61 of one guide portion (for example, 60A) faces the receiving wall face 61 of the other guide portion (for example, 60B) that forms a pair with that guide portion. This receiving wall face 61 is erected approximately perpendicular (most preferably at a right angle) to a bottom face 52a of the recess 52. Also, a top face 62 is formed at the top of each guide portion 60, and this top face 62 is parallel to the bottom face 52a of the recess 52.

Figure 3B:
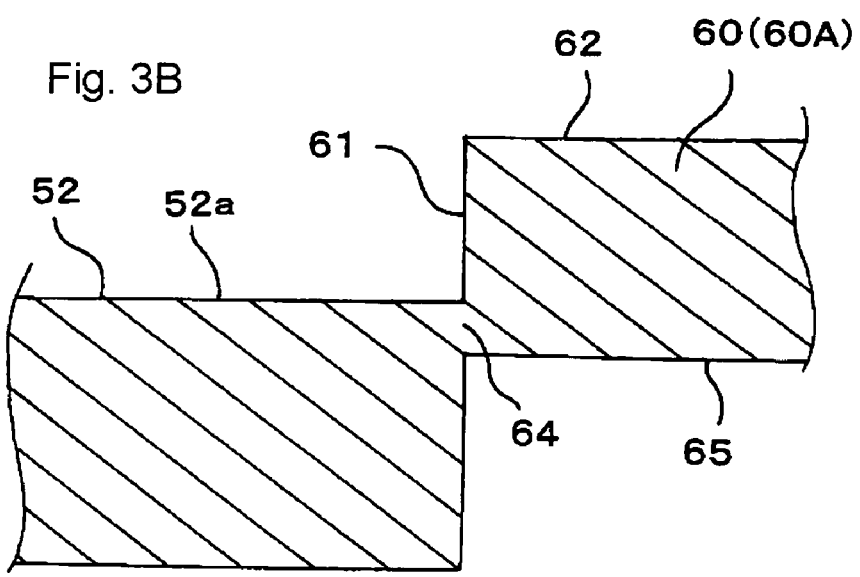
FIG. 3B is an enlarged outline cross-sectional view of a cross-section taken along line B-B in FIG. 1.

In each guide portion 60, a chamfer portion 63 is provided at an edge (the upper edge in FIG. 3) of the receiving wall face 61 in a position where the receiving wall face 61 and the top face 62 intersect. This chamfer portion 63 is formed as a tapered face, that is, a face that is inclined relative to both the receiving wall face 61 and the top face 62. As is understood from FIG. 1, in this embodiment, the chamfer portion 63 is provided in a part of the entire edge of the receiving wall face 61 in the position where the receiving wall face 61 and the top face 62 of the guide portion 60 intersect (that is, the entire guiding span along the receiving wall face 61). More specifically, the chamfer portion 63 is provided only in a center portion excluding the vicinity of both ends in the guiding direction of the receiving wall face 61, and a chamfer portion is not provided other than in that center portion. The length of the chamfer portion 63 is about ¼ to ½ (in this embodiment, about ⅓) of the entire length of the edge of the receiving wall face 61 in the position where the receiving wall face 61 and the top face 62 intersect. The portion other than the center portion having the chamfer portion 63 has the same cross-sectional structure as the conventional example, as shown in FIG. 3B.

On the other hand, as shown in FIG. 3A, a connecting portion 64 is provided directly below the receiving wall face 61 of each guide portion 60, and approximately directly below the tapered chamfer portion 63. The connecting portion 64 connects the guide portion 60 and a wall portion below the bottom face 52a of the recess 52. The connecting portion 64 has a thick portion 66 swollen in the downward direction from a lower face 65 of the guide portion 60, and in that thick portion 66, a tapered face 66a that is inclined relative to the guide lower face 65 is formed. This thick portion 66 is disposed vertically opposite to the tapered chamfer portion 63. Also, the inclination angle of the thick portion tapered face 66a is about the same as the inclination angle of the chamfer portion 63, and as a result, the tapered chamfer portion 63 and the tapered face 66a of the thick portion 66 are approximately parallel.

The structure of the chamfer portion 63, the thick portion 66 that thickens the connecting portion 64, and the like in each guide portion 60 is described with reference to FIG. 3A, which shows a cross-section of the guide portion 60A, but each of the three other guide portions 60B, 60C, and 60D also has the same structure.

In this embodiment, the thick portion 66 disposed facing the tapered chamfer portion 63, and having the tapered face 66a that is approximately parallel to the chamfer portion 63, is provided directly or nearly directly below the base end portion of the receiving wall face 61 of the guide portion 60 of the base plate 50 serving as a fixed-side housing, and thus the connecting portion 64 that connects the guide portion 60 with other parts is thickened. Accordingly, it is possible to strengthen the connecting portion 64 relative to a conventional reclining apparatus, and consequently, in a case where the locking gear 15 has pressed against the receiving wall face 61 of the guide portion 60 with a high surface pressure, for example such as during a vehicle collision, it is possible to reduce the risk that the connecting portion 64 will break relative to a conventional reclining apparatus.

In this embodiment, not only is thickening of the connecting portion 64 achieved by providing the thick portion 66 having the tapered face 66a, the thick portion 66 being provided directly or nearly directly below the base end portion of the receiving wall face 61 of the guide portion 60, but furthermore, at the edge of the receiving wall face 61 that corresponds to the thick portion 66, the tapered chamfer 63 is provided approximately parallel to the tapered face 66a of the thick portion 66. Therefore, even when manufacturing the base plate 50 by press-molding a metal plate, it is possible to avoid a situation in which the edge of the molding die bites into the metal plate (and thus the base plate 50) so that pressing deformations concentrate in the connecting portion 64. Thus, it is possible to prevent as much as possible the occurrence of breakage when pressing, or molding defects caused by too much or too little thickness, for example, due to the concentration of deformations. Accordingly, with this embodiment, it is possible to provide the base plate 50 as a press-molded product with further improved durability relative to a conventional product.

In this embodiment, as a result of providing the tapered chamfer portion 63 at the edge of the receiving wall face 61 of the guide portion 60, the area of the receiving wall face 61 is reduced to that extent. Consequently, it is possible to reduce the force necessary to operate the locking gear 15.

In this embodiment, the tapered chamfer portion 63 is provided only in about ¼ to ½ of the entire span of the edge of the receiving wall face 61 of the guide portion 60 (only in a center portion excluding the vicinity of both ends in the guiding direction of the receiving wall face 61). In other words, in the span where the tapered chamfer 63 is not provided at the edge of the receiving wall face 61, the chamfer portion 63 is not present, and thus a relatively large area is secured for the receiving wall face 61. Accordingly, in the guide portion 60 of this embodiment, the fundamental function (i.e., the pressure receiving function) of the receiving wall face 61 is not sacrificed due to having the tapered chamfer 63; an adequate area of contact with the locking gear 15 is secured in the receiving wall face 61 of the guide portion 60. In other words, in this embodiment, the two technical demands of improving the strength of the connecting portion 64 by providing the tapered chamfer portion 63 and securing adequate pressure receiving area of the receiving wall face 61 of the guide portion 60 are both achieved; neither technical demand is sacrificed.

The base plate 50 of this embodiment is produced by press-molding a metal plate, and the receiving wall face 61, the top face 62, and the tapered chamfer portion 63 of the guide portion 60, as well as the connecting portion 64 thickened with the thick portion 66, are molded as a single body at the same time as that metal plate press-molding is performed. With this base plate 50, when press-molding the thick portion 66 that has the tapered face 66a on one face side of the base plate 50, the tapered chamfer portion 63 is correspondingly press-molded at the same time on the opposite face side, so deformation or movement of the metal material can be performed easily. Accordingly, it is possible to avoid a situation in which pressing deformations concentrate in the connecting portion 64 as described above, so by preventing the occurrence of breakage when pressing or molding defects caused by too much or too little thickness, for example, due to the concentration of deformations, it is possible to produce the base plate 50 with high quality using press molding.

Modified Examples

Figure 5:
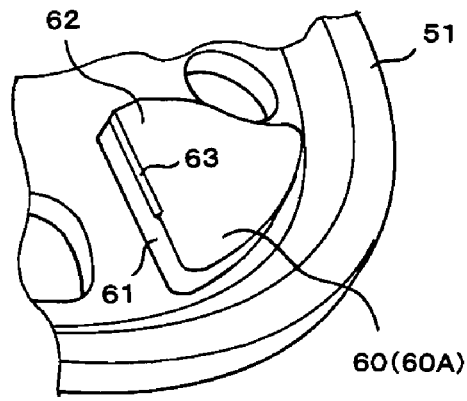
FIG. 5 is a partial perspective view of a first modified example of a guide portion of a fixed-side housing.
Figure 6:
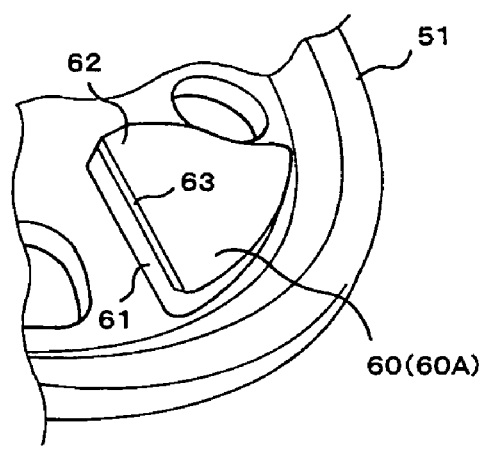
FIG. 6 is a partial perspective view of a second modified example of a guide portion of a fixed-side housing.
Figure 7A:
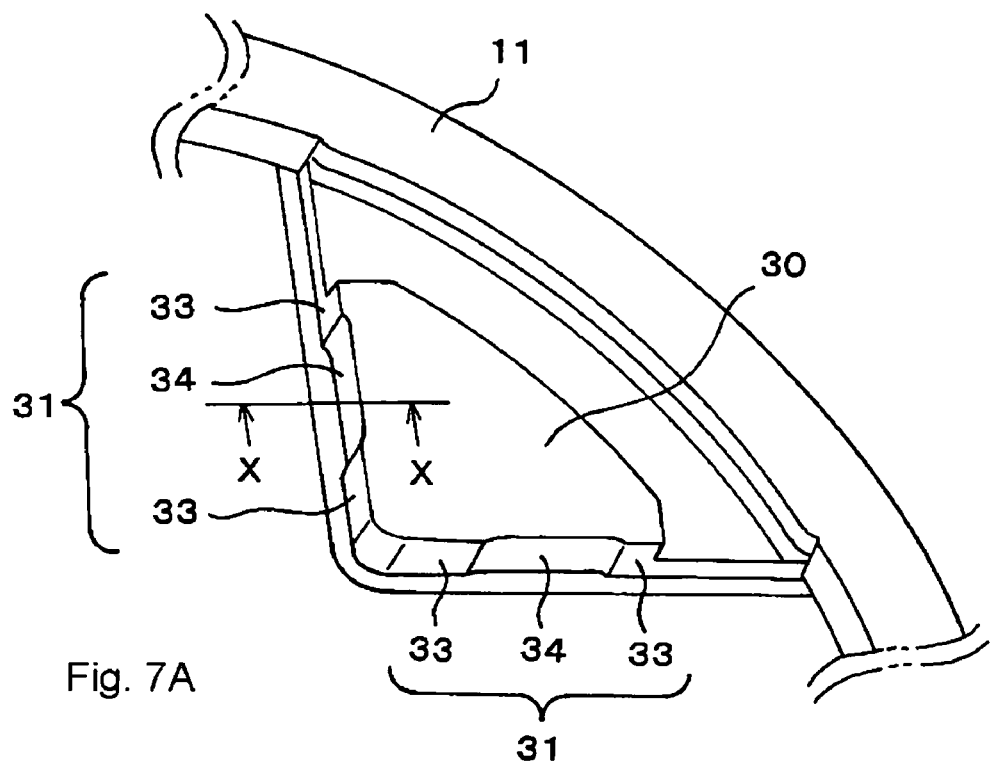
FIG. 7A is a partial perspective view that shows a guide portion of a conventional fixed-side housing.
Figure 7B:
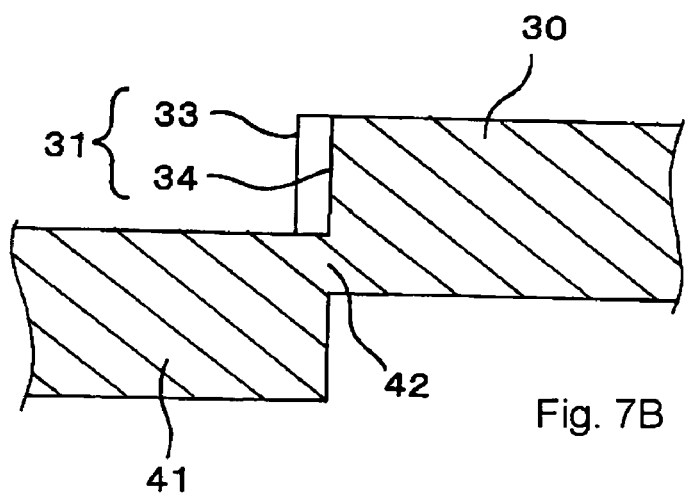
FIG. 7B is an enlarged outline cross-sectional view of a cross-section taken along line X-X in FIG. 7A.

The invention is not limited to the embodiment shown in FIGS. 1 to 4; modified embodiments as shown in FIGS. 5 and 6 are also possible. FIGS. 5 and 6 show variations of the length of the tapered chamfer portion 63. In the modified example shown in FIG. 5, the tapered chamfer portion 63 is provided, in the entire span of the edge of the receiving wall face 61 in the position where the receiving wall face 61 and the top face 62 intersect, in a span from one end of the receiving wall face 61 in the guiding direction to the center portion. In the modified example shown in FIG. 6, the tapered chamfer portion 63 is provided throughout the entire span of the edge of the receiving wall face 61 in the position where the receiving wall face 61 and the top face 62 intersect. Note that, although not clear from FIGS. 5 and 6, it is of course the case that in these modified examples, the thick portion 66 disposed facing the tapered chamfer portion 63, and having the tapered face 66a that is approximately parallel to the chamfer portion 63, is provided directly or nearly directly below the base end portion of the receiving wall face 61. Also, in the modified examples shown in FIGS. 5 and 6, the length of the tapered chamfer portion 63 is increased, and to that extent the area of the receiving wall face 61 is slightly reduced, but due to also increasing the length of the thick portion 66 that corresponds to the tapered chamfer portion 63, the strength of the connecting portion 64 is increased more in this design than in the case of the embodiment described above.

In the above embodiment (FIGS. 1 to 4) and the above modified examples (FIGS. 5 and 6), a base plate 50 was described in which one receiving wall face 61 is formed in one guide portion 60, but the invention is also applicable to a base plate in which, same as in the conventional example, two receiving wall faces 61 are formed in one guide portion 60.

Note

In the present specification, it is stated that the tapered chamfer portion 63 positioned at the edge of the receiving wall face 61 is "approximately parallel" to the tapered face 66*a* of the thick portion 66 positioned directly or nearly directly below the receiving wall face 61. Here, "approximately parallel" does not mean parallel within a geometrically strict meaning, but rather, means that the tapered chamfer portion 63 and the thick portion tapered face 66*a* as molded parts may be somewhat non-parallel, as long it is possible to satisfy the objective of avoiding the concentration of deformation in the connecting portion 64, or molding defects caused by too much or too little thickness, for example, when molding the connecting portion 64 by press-molding a metal plate.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A reclining apparatus provided with a fixed-side housing and a rotating-side housing that are disposed facing each other, an internal gear provided in the rotating-side housing, and a locking gear that is provided in a movable manner in a storage space secured between the fixed-side housing and the rotating-side housing and is capable of being engaged with or separated from the internal gear, the reclining apparatus comprising:

said fixed-side housing being substantially disk shaped;

two pairs of guide portions provided in the fixed-side housing and protrude toward the rotating-side housing, a receiving wall face that makes contact with the locking gear and thus guides movement of the locking gear, and a top face that is continuous with that receiving wall face, being formed in each guide portion; and a tapered chamfer portion provided at an edge of the receiving wall face in a position where the receiving wall face and the top face of the guide portion intersect, wherein by providing a thick portion that has a tapered face that corresponds to the tapered chamfer portion, the thick portion being provided directly or nearly directly below a base end portion of the receiving wall face, a connecting portion that integrally connects the guide portion of the fixed-side housing with other parts is thickened, and wherein the tapered chamfer portion is provided only in at least a part of an entire span of the edge of the receiving wall face in the position where the receiving wall face and the top face intersect.

2. The reclining apparatus according to claim 1, wherein the thick portion that thickens the connecting portion is disposed opposite to the tapered chamfer portion, and the tapered face of the thick portion is approximately parallel to the tapered chamfer portion and wherein the thick portion strengthens the connecting portion to resist forces generated by a locking of the locking gears to substantially eliminate breakage of the connecting portion.

3. The reclining apparatus according to claim 2, wherein the fixed-side housing is produced by press-molding a metal plate, and the receiving wall face, the top face, and the tapered chamfer portion of the guide portion, as well as the connecting portion thickened with the thick portion, are molded as a single body when the metal plate press-molding is performed.

4. The reclining apparatus according to claim 2, wherein the force generated by the locking of the locking gears is due to a sudden acceleration or deceleration of a vehicle in which the reclining apparatus is installed.

5. The reclining apparatus according to claim 1, wherein the fixed-side housing is produced by press-molding a metal plate, and the receiving wall face, the top face, and the tapered chamfer portion of the guide portion, as well as the connecting portion thickened with the thick portion, are molded as a single body when the metal plate press-molding is performed.

6. The reclining apparatus according to claim 1, wherein each of the two pairs of guide portions hold the locking gear therebetween so that the locking gear is movable in a radial direction of the fixed-side housing.

7. The reclining apparatus according to claim 1, wherein the tapered chamfer portion reduces a surface area of the receiving wall face in the position where the receiving wall face and the top face intersect, and wherein the reduction reduces the force necessary for the locking gear to move in a radial direction.

* * * * *